United States Patent [19]

Marriner

[11] 3,818,854

[45] June 25, 1974

[54] FLEXIBLE CONNECTION FOR ARTICULATING VESSELS

[76] Inventor: John E. Marriner, 555 E. Ocean Blvd., Long Beach, Calif. 90802

[22] Filed: Sept. 21, 1973

[21] Appl. No.: 399,479

Related U.S. Application Data

[60] Division of Ser. No. 251,021, May 8, 1972, and a continuation-in-part of Ser. No. 88,938, Nov. 12, 1970.

[52] U.S. Cl. .......................................... 114/235 R
[51] Int. Cl. ............................................. B63b 21/56
[58] Field of Search .......... 114/235 R, 235 A, 77 R, 114/.5 F, 43.5, 213; 280/511, 514, 508; 24/230 LP, 230 F, 208 R; 403/220, 291, 292; 64/7, 8, 11 R, 11 F; 46/221, 26, 31; 267/69, 70, 71, 72, 73, 74, 63 R

[56] References Cited
UNITED STATES PATENTS

| | | | |
|---|---|---|---|
| 2,341,757 | 2/1944 | Brenneman et al. | 46/26 |
| 2,876,726 | 3/1959 | Robishaw | 114/.5 F |
| 3,224,137 | 12/1965 | Wright et al. | 46/221 |
| 3,357,694 | 12/1967 | Kidder et al. | 267/70 |
| 3,452,452 | 7/1969 | Dore | 46/26 |

*Primary Examiner*—Trygve M. Blix
*Assistant Examiner*—Charles E. Frankfort
*Attorney, Agent, or Firm*—Fulwider, Patton, Rieber, Lee & Utecht

[57] ABSTRACT

A coupling apparatus interposed between two vessels to connect such vessels in an articulated manner. The vessels may be components of a barge train. The coupling apparatus permits the barges to be individually removed from such train. The apparatus includes one or more resilient posts removably interposed between the vessels. The resiliency of the posts permits the posts to flex and bend for accommodating simultaneous relative movement in roll, pitch, yaw, surge and heave between the vessels resulting from wave action.

6 Claims, 23 Drawing Figures

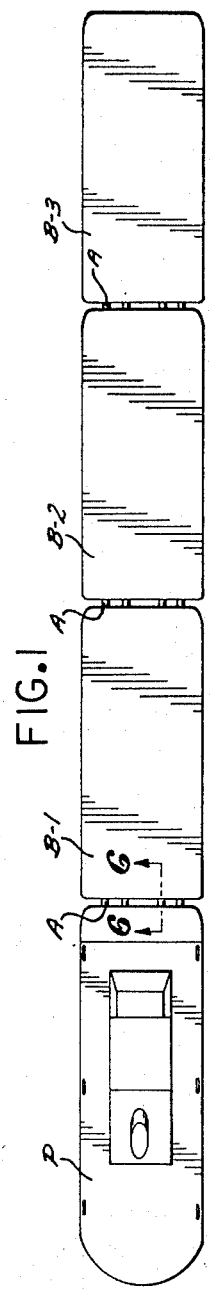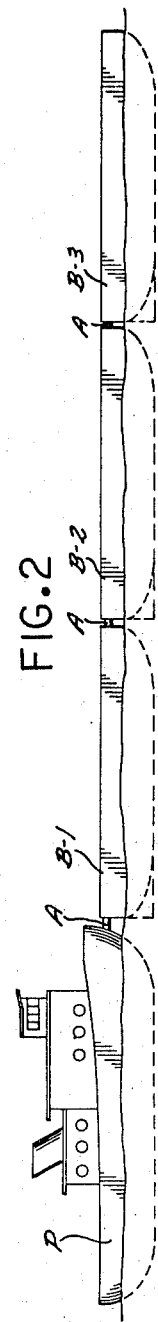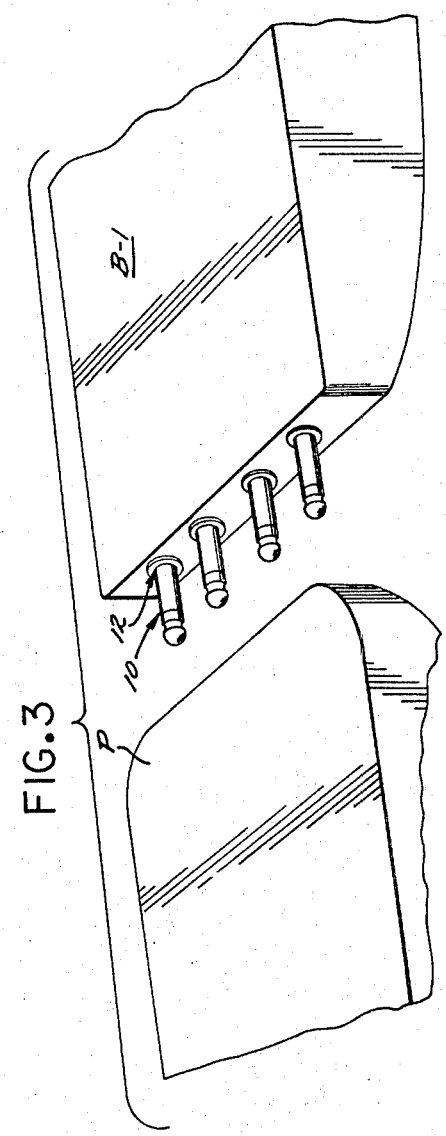

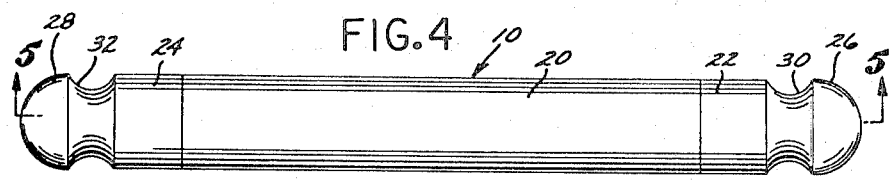
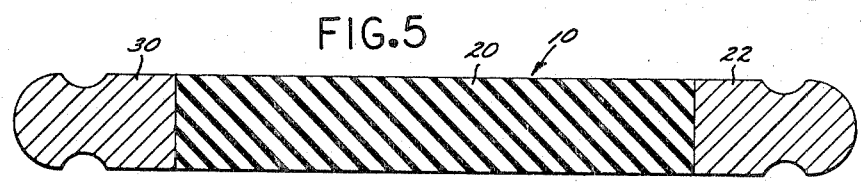
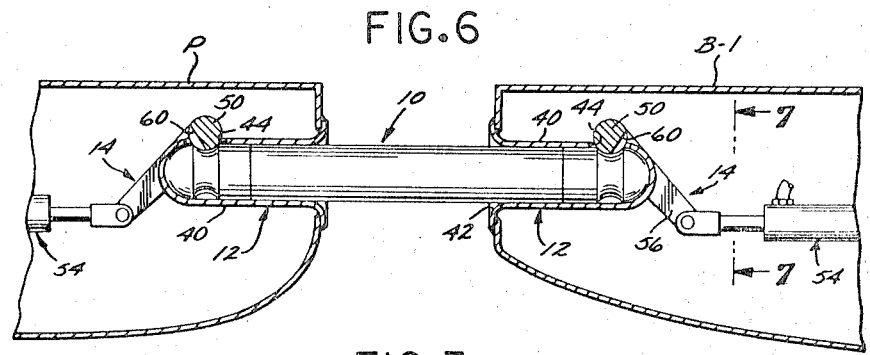
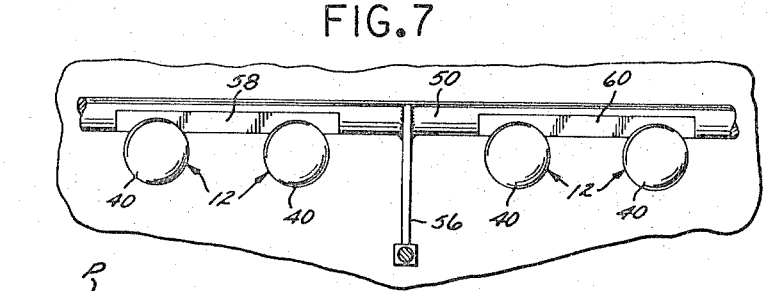
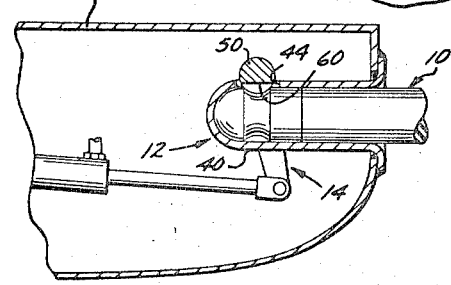

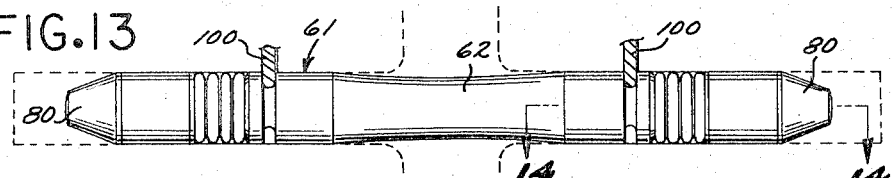
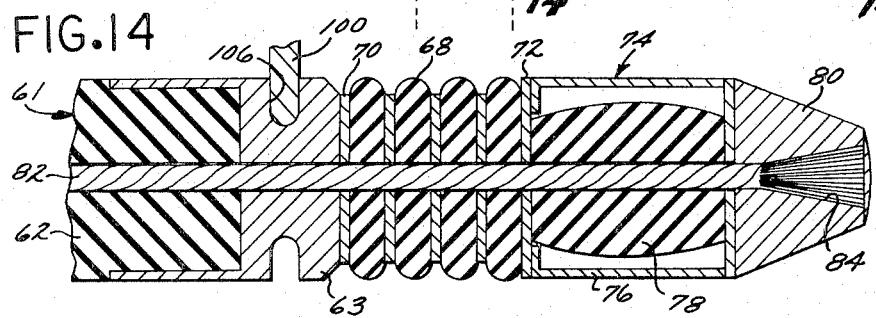
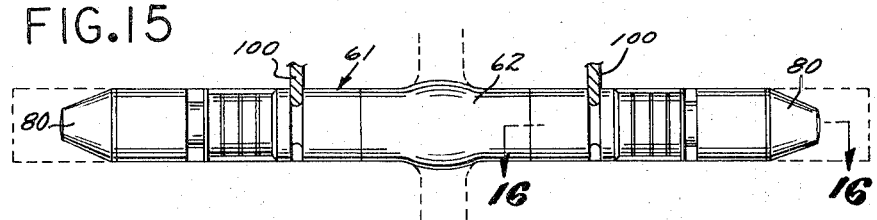
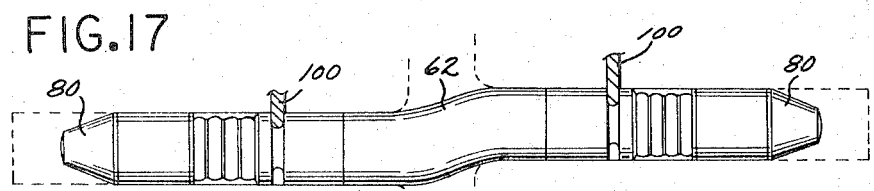
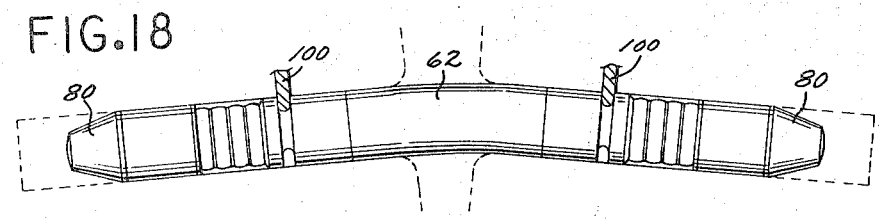
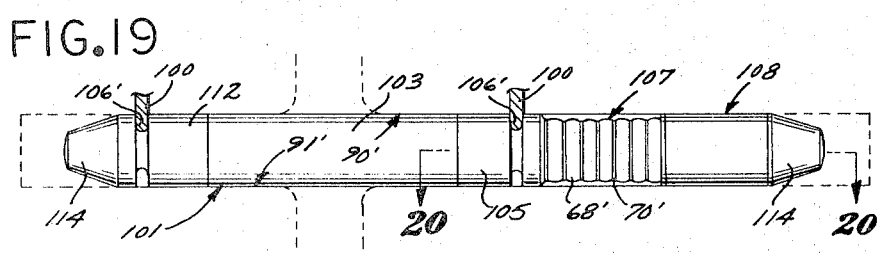

PATENTED JUN 25 1974
3,818,854
SHEET 5 OF 5

FLEXIBLE CONNECTION FOR ARTICULATING VESSELS

CROSS-REFERENCE TO RELATED APPLICATION

This is a division of my U.S. Pat. application Ser. No. 251,021 filed May 8, 1972, a continuation-in-part of Ser. No. 88,938 filed Nov. 12, 1970.

BACKGROUND OF THE INVENTION

It has been heretofore proposed to provide a train of barges connected to one another by means of a quick-connect and disconnect hinge coupling, with the rearmost barge similarly connected to a propulsion unit which pushes the barges, and the assembly of barge train and propulsion unit comprising an articulated vessel. Such an articulated vessel would afford many important advantages in cargo handling and delivery as compared to the conventional single hull vessel. By way of example, individual barges could be loaded and discharged independently of the operation of the propulsion unit. Accordingly, cargo could be loaded and unloaded at times convenient to the consignor and consignee. It would not be necessary (as with a conventional single hull vessel) to proceed to individual docks or wharves for loading and discharge, nor would it be necessary to stand-by while loading and discharging at anchor in the stream. Also, it would not be necessary to proceed up and down rivers for cargo. Instead, such an articulated barge train could enter port, anchor and then proceed to disconnect individual barges for that port of entry and pick up barges ready to proceed to the next port of destination. In the case of a marine casualty involving grounding, collision or enemy action, it would be possible to disengage the damaged barge or barges from the train, with the remaining barges and the propulsion unit continuing the journey. Many other advantages could be obtained from the use of such an articulated barge train.

Applicant is aware of several United States Patents which have been issued directed to this concept, including, U.S. Pat. Nos. 45,700; 1,259,860; 1,797,600; 3,035,536; 3,125,059; 3,257,986 and 3,494,318.

None of the articulated barge trains heretofore proposed have been commercially successful, however. It would appear that such lack of commercial success was due primarily to the heavy, bulky and expensive nature of the couplings interposed between the adjoining vessels, it being understood that such couplings must be capable of bending while withstanding compressive and tensive forces of large magnitudes, afford ready disconnectability of adjoining vessels, and yet permit the adjoining vessels to freely undergo simultaneous relative movement in roll, pitch, yaw, surge and heave due to the effect of wave action on the vessels.

SUMMARY OF THE INVENTION

It is a major object of the present invention to provide a force-transfer coupling apparatus interposed between two closely adjoining vessels which will accommodate relative movement between the vessels.

Another object is to provide an apparatus of the aforedescribed nature which permits such vessels to be readily disconnected from one another.

Another object is to provide a coupling apparatus of the aforedescribed nature which is relatively inexpensive of construction, foolproof in operation and capable of affording a long service life.

Yet another object of the present invention is to provide coupling apparatus of the aforedescribed nature utilizing resilient post means interposed between the vessels, with such post means being removably received within complementary socket means on said vessels, and with lock means being provided for removably retaining the post means within the socket means. The post means are sufficiently resilient to accommodate relative movement between the vessels, but have sufficient strength to transmit compressive and tensive forces from one vessel to the other while permitting the vessels to undergo simultaneous relative movement in roll, pitch, yaw, surge and heave.

It is an object of one form of the present invention to provide coupling apparatus of the aforedescribed nature wherein the post means are adjustably retractable relative to one of the vessels to accommodate water conditions and for stowage.

DESCRIPTION OF THE DRAWINGS

FIG. 1 is a top plan view of a barge train utilizing a preferred form of coupling apparatus embodying the present invention;

FIG. 2 is a side elevational view of said train;

FIG. 3 is a broken perspective view showing said coupling apparatus;

FIG. 4 is a side elevational view of the post member of said coupling apparatus;

FIG. 5 is a vertical sectional view taken along line 5—5 of FIG. 4;

FIG. 6 is a vertical sectional view taken in enlarged scale along line 6—6 of FIG. 1;

FIG. 7 is a broken vertical sectional view taken along lines 7—7 of FIG. 6;

FIG. 8 is a broken vertical sectional view showing the operation of the lock means of said coupling apparatus;

FIG. 13 is a top plan view of the post member of FIG. 10 as such post member appears when it is in tension;

FIG. 14 is a vertical sectional view taken in enlarged scale on line 14—14 of FIG. 13;

FIG. 15 is a top plan view of the post member of FIG. 10 when said post member is under compression;

FIG. 17 is a top plan view of the post member of FIG. 10 when such post member is disposed in a heaving condition;

FIG. 18 is a top plan view of the post member of FIG. 10 when such post member is in a bending position;

FIG. 19 is a third form of post member embodying the present invention;

FIG. 20 is a vertical sectional view taken in enlarged scale along line 20—20 of FIG. 19;

FIG. 21 is a side elevational view of a retractable post member embodying the present invention, such post member being arranged in its stowed position;

FIG. 22 is a view similar to FIG. 21, but showing such post member disposed in a calm-water barge coupling position;

FIG. 23 is a view similar to FIG. 21, but showing such post member arranged in a rough-water barge coupling position.

DESCRIPTION OF THE PREFERRED EMBODIMENTS

Figure 9:
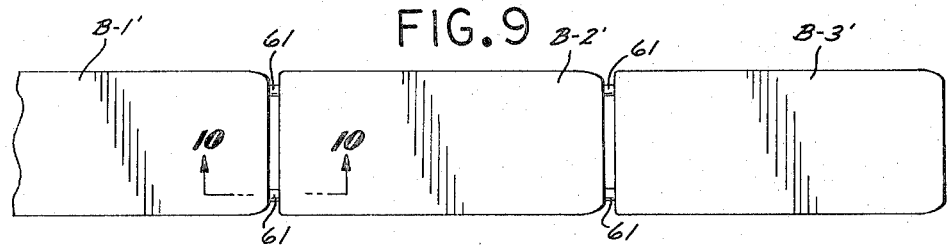
FIG. 9 is a top plan view of a portion of a barge train utilizing a second form of coupling apparatus embodying the present invention.

Referring to the drawings and particularly FIGS. 1 and 2 thereof, there is shown a barge train utilizing a preferred form of coupling apparatus embodying the present invention. The barge train includes a propulsion unit P and a plurality of closely adjoining barges B1, B2 and B3. The propulsion unit P may take the form of a conventional push or tug boat, while the barges are likewise of conventional construction. The bow of the push boat P and the stern of barge B1, the bow of barge B1 and the stern of barge B2 and the bow of barge B2 and the stern of barge B3 are interconnected by similar coupling apparatus A embodying the present invention.

Referring now to the remaining figures of the drawings, the coupling apparatus A includes resilient post means, generally designated 10; complementary socket means, generally designated 12, secured to the bow and stern of adjoining vessels; and lock means, generally designated 14 (shown in FIGS. 6, 7 and 8) that releasably retain the opposite ends of the post means 10 within socket means 12. The resilient nature of the post means 10 permit such post means to flex and thereby accommodate relative movement between the adjoining vessels while transferring compressive and tensive forces from one vessel to another. As indicated in FIG. 3, however, the post means are sufficiently rigid as to be self-supporting in a horizontally extending position when one end of such post means is disconnected from an adjoining vessel.

More particularly, and referring now to FIGS. 4 and 5, the post means 10 are each of like construction and include a cylindrical body 20 formed of a resilient material which is capable of transferring compressive and tensive forces of large magnitudes. A suitable resilient material is Neoprene. Other materials may be employed, however. Rigidly secured to the front and rear of the cylinder 20 are a front cap 22 and a rear cap 24 both formed of a rigid, wear-resistant material such as steel. The portion of the caps 22 and 24 adjoining the front and rear ends of cylinder 20 are of generally hemispherical configuration defining knobs 26 and 28, respectively. The intermediate portions of the front and rear caps are formed with an annular groove, designated 30 and 32, respectively.

Referring now to FIG. 6, the socket means 12 of each vessel are of like construction and are secured to the bow and stern portions of each of the adjoining vessels. Each socket element includes a barrel 40 having its outer portion secured as by welding to the stern or transom of one of the vessels of the barge train in alignment with a bore 42 formed in such stern or transom. Each bore 42 is formed with a flared entry to facilitate guiding of the front or rear cap of each post 10 within the barrel 40. The inner end of each socket is of generally semi-hemispherical configuration approximately the configuration of the knobs 26 and 28, of the nose and tail caps 22 and 24. A transverse opening 44 is formed in the upper surface of each of the barrels 40 in vertical in alignment with the locking grooves 30 and 32 of the nose and tail caps 22 and 24, respectively.

Referring now particularly to FIGS. 6, 7 and 8, the locking means 14 of each vessel are of like construction, with one such locking means being disposed in the bow and stern portion of each of the vessels of the barge train. Each locking means includes a horizontal latch bar 50 aligned with the openings 44 of each socket barrel 40. Suitable conventional bearings (not shown) are provided for supporting these latch bars 50 for rotation about their longitudinal axis. Such rotation can be effected by means of a conventional fluid-actuated cylinder and piston unit 54, with the piston rod thereof being pivotally connected to the free end of a crank arm 56. The opposite end of each crank arm 56 is rigidly affixed as by welding to the midportion of its respective bar 50, as shown in FIG. 7. Each latch bar 50 is formed with a pair of flats 58 and 60.

In the embodiment of the invention shown in FIGS. 1–8, four posts 10 and four complementary sockets 12 are shown. It should be understood, however, that the number of such posts and sockets may be varied in accordance with the size of the vessels and the expected sea conditions encountered thereby. It should be further noted that the construction of the posts 20 may be varied. By way of example, the resilient cylinder 20 may be of tubular construction rather than solid construction.

In the operation of the aforedescribed coupling apparatus, normally one end of each of the posts 10 will be initially secured to the stern of one of the vessels of the barge train, as for example, barge B2 as indicated in FIG. 6. At this time the front cap 24 will be locked within its complementary socket 12 by means of the latch bar 50, such latch bar being positioned as shown in FIG. 6, with its flats 58 and 60 extending at an inclined angle relative to the longitudinal axis of the post 10. With the posts 10 extending from the rear of barge B1, push boat P will be moved towards the stern of barge B1 and the rear end of the posts 10 will be inserted within the sockets 12 of the push boat. During such insertion, the cylinder and piston unit 54 of the push boat will be arranged in their position of FIG. 8 so as to dispose the flats 58 and 60 of latch bar 50 in a horizontal plane outside the confines of barrels 40 so that latch bar 50 is clear of the interior of the barrels. When the rear caps 22 of the posts 10 are fully inserted within their respective barrels 40, the cylinder and piston unit 54 of push boat P will be actuated so as to rotate the latch bar 50 to its position of FIG. 6. At this time the latch bar 50 will enter into the locking grooves 30 so as to positively lock the rear caps 22 of the posts 10 within their complementary recesses.

With the posts 10 securely retained within their complementary sockets 12, such posts can bend while transferring compressive and tensive forces between the push boat P and barge B1; between barge B1 and barge B2; and between barge B2 and barge B3. Concurrently, because of the resilient nature of the posts 10, the individual vessels of the barge train are free to undergo simultaneous relative movement resulting from the forces of the wind, waves, and perhaps currents, tending to make such vessels roll, pitch, yaw, surge and heave.

When it is desired to remove one of the vessels of the barge train from the train, the lock means 14 on either the vessel to be removed or on either of the vessels adjacent thereto will be actuated so as to rotate the latch bar 50 to its release position of FIG. 8. The posts 10 disposed within the sockets associated with such lock means can then be freely retracted from within their sockets. The provision of lock means 14 at each end of each vessel, permits not only flexibility of operation with respect to the end of the vessels from which the posts will be removed, but additionally it renders simple any necessary replacement of the posts 10.

If desired tether lines may be utilized between adjoining vessels to permit fluid and/or electric power to be progressively transferred from push boat P to the barges as the latter are joined to the train.

Referring now to FIGS. 9–18, there is disclosed a second form of coupling apparatus embodying the present invention. In FIG. 9 there is shown a barge train including a plurality of closely adjoining barges B1', B2' and B3'. Each pair of barges is interconnected by a pair of like post members, generally designated 61, rather than four of such post members, as with the arrangement of FIGS. 1–8.

Figure 10:
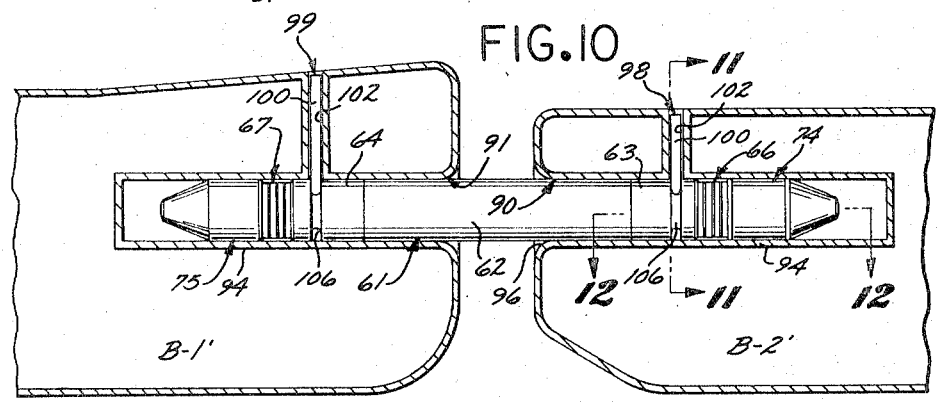
FIG. 10 is a vertical sectional view taken in enlarged scale along line 10—10 of FIG. 9.
Figure 12:
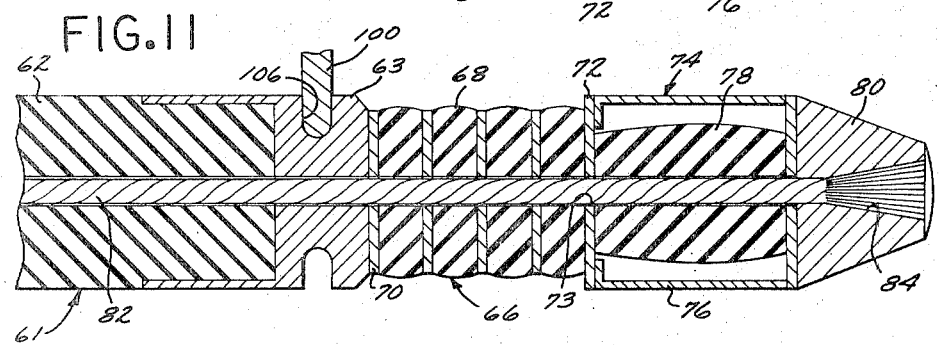
FIG. 12 is a horizontal sectional view taken in further enlarged scale along line 12—12 of FIG. 10.

In FIGS. 10 and 12 a post member 61 is shown in its normal relaxed position. Each post member 61 includes a center body 62 formed of a resilient material, with such center body being rigidly affixed, as by bonding, to like rigid front cap 63 and similar rear cap 64. Extending axially outwardly of caps 63 and 64 are front and rear like main snubbers, generally designated 66 and 67, and comprising a plurality of like resilient rings 68 between which are sandwiched a plurality of like rigid metallic rings 70. Outwardly of and bonded to the outermost resilient ring 68 of each main snubber is an annular backing plate 72 having a coaxial bore 73. Front and rear auxiliary snubbers, generally designated 74 and 75, abut the outer surface of each plate 72.

Each auxiliary snubber includes a rigid cylindrical cage 76 within which is disposed an elongated tube 78 formed of resilient material. The outer end of each cage 76 is formed with a rigid cap element 80 of generally frusto-conical configuration. A tension element, such as a cable 82, extends coaxially through the post member 61, with the front and rear ends of such cable being rigidly secured, as by swaging, within an axial passage 84 formed in caps elements 80. Preferably, the length of cable 82 is so selected that when post member 61 is in its relaxed position of FIGS. 9–12, cable 82 is prestressed sufficiently to apply compression to rings 68 and tube 78. It should be understood that all of the elements between front and rear cap elements 80 can undergo longitudinal movement relative to cable 82. Cable 82 serves to limit the longitudinal distance center body 62 can be stretched when post member 61 is placed in tension.

The post members 61 are received by like socket means, generally designated 90 and 91, formed in the bow and stern portions of the adjoining barges. The socket means 90 and 91 are mirror images of one another and include a barrel 94 formed with a flared entry 96 to facilitate guiding of the caps 80 thereinto.

Figures 11, 16:
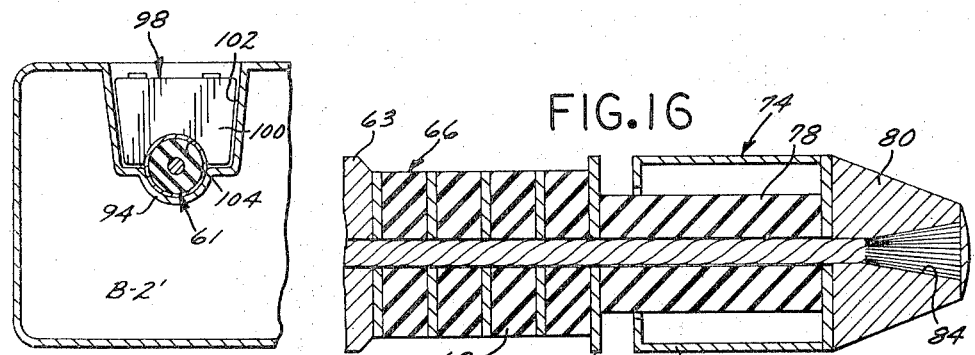
FIG. 11 is a vertical sectional view taken on line 11—11 of FIG. 10.
FIG. 16 is a vertical sectional view taken in enlarged scale along line 16—16 of FIG. 15.

Referring particularly to FIGS. 10 and 11, like front and rear guillotine-type lock means, generally designated 98 and 99, are interposed between each of the socket members 90 and 91 and their respective post members 61. Such lock means each include a vertical blade 100 which is vertically slidably carried within a vertical guideway 102 that extends upwardly from the intermediate portion of each barrel 94. The lower portion of each such blade is formed with an arcuate recess 104, which is selectively engagable with an external locking groove 106 formed in front and rear end caps 63 and 64 of post member 61. The blades 100 may be moved vertically either manually or by power-operated means (not shown).

Referring now to FIG. 14, each post member 61 is adapted to undergo bending, compression and tension in transferring compressive and tensive forces between adjoining barges, while such barges undergo simultaneous relative movement in pitch, heave, roll, yaw and sway. In FIG. 13 the post member 61 is shown resisting a load in tension applied by the blades of lock means 98. It will be noted that under a tension load the resilient rings 68 and tube 78 of the main and auxiliary snubbers 66 and 74, respectively, are placed in compression by means of caps 80 and cable 82.

Referring now to FIGS. 15 and 16, the elements of post member 61 are shown as they appear when such post member transfers compressive forces between two adjoining barges. Thus, it will be noted that the mid-portion of the resilient center body 62 will be squeezed radially outwardly. Upon this occurrance, the cage 76 and its cap element 80 will move longitudinally outwardly relative to the rest of the other elements of the post member. Additionally, the resilient rings 68 and the resilient tube 78 are free to assume their relaxed configuration.

Referring now to FIG. 17, there is shown a top plan view of post member 61 when the elements thereof are disposed in a heaving condition. It will be noted that because of the unconfined nature of the intermediate portion of the center body 62, such center body can readily flex to accommodate the relative sideward motion of the two adjoining barges. While only one of the post members is shown it will be understood that the other post member of a pair thereof will flex in a similar manner.

Referring now to FIG. 18, there is shown a top plan view of one of the pair of post members 61 when the elements of such post member are arranged in a bending position so as to accommodate yaw between two adjoining barges. Again it would be clear that because of the unconfined nature of the center body 62, such center body can readily bend and concurrently stretch to accommodate such yaw. Concurrently, the other post member disposed at the opposite side of the adjoining barges will undergo concurrent bending and compression to accommodate yaw between the barges.

Referring now to FIGS. 19 and 20, there is shown a third form of post member, generally designated 101, embodying the present invention. Post member 101 includes a resilient center body 102. One end, as for example, the front end of such post member is provided with an end cap 105 forwardly of which is disposed a main snubber 106 generally similar to the aforedescribed main snubber 68, but utilizing additional resilient rings 68' and metallic rings 70'. Forwardly of the main snubber 106 is disposed an auxiliary snubber 108 which is similar in construction to the aforedescribed auxiliary snubber 74, except that it is of greater length. The rear of opposite end of center body 102 is affixed to a rear end cap 112 similar in construction to the front end cap 105. Outwardly of each end cap there is disposed a frustoconical cap element 114 similar to the aforedescribed cap element 80. A cable 82 extends between cap elements 114. With the arrangement of FIGS. 19 and 20 the snubbing action takes place solely to one side of the center body 102 rather than at both sides. It will be noted that the end caps 105 and 112 are provided with annular locking grooves 106' similar to those utilized in the apparatus of FIGS. 9–18. The front and rear of post member 101 are respectively received within socket members 90' and 91' that are operatively associated with lock means 98' and 99' of the type described hereinbefore.

Referring now to FIGS. 21, 22 and 23 there is shown a post member 101 of the type disclosed in FIGS. 19 and 20 arranged so as to be longitudinally moveable within stern socket means, generally designated 150, of a barge B-2'. Socket means 150 is generally similar to the aforedescribed socket means 90 and 91 including a barrel 152 formed with a flared entry 154 to facilitate guiding of the front cap 114 of post member 101 thereinto. The flared entry 104 faces aft from the transom 156 of barge B-2'. The stern portion of barge B-2' is formed with a front vertical guideway 158 for a guillotine blade 160 similar to blade 100 described hereinbefore. The blade 160 is selectively vertically movable into front slot 162, intermediate slot 164 and rear slot 166 formed in such barrel 152. In FIG. 21 the locking blade 160 is shown extending downwardly through front slot 162 and into an external front locking groove 170 of post member 101. At this time, the rear end of the post member is positioned generally in vertical alignment with transom 156 of barge B-2'. This is the stowed position of the post member.

Referring now to FIG. 22, when it is desired to couple barge B-2' to barge B-1', post member 101 will be partially extended aft from the barrel 152 of socket means 150. This movement can be effected by first raising locking blade 160 from locking slot 170. Thereafter, post member 101 is urged rearwardly until slot 170 is in vertical alignment with guideway 158. Thereafter, locking blade 160 is lowered through intermediate slot 164 so as to engage locking groove 170.

Barge B-1' is also provided with a vertical guideway 180 within which is vertically slidably carried a vertical locking blade 182. Locking blade 182 is engagable with an external locking groove 184 formed in rear end cap 112 of post member 101. It should be understood that when the barges B-1' and B-2' are utilized under calm water conditions, the transoms thereof may be disposed relatively close together. This is the arrangement shown in FIG. 22.

Referring now to FIG. 23, when the barges are to be utilized under rough water conditions, it is desirable that their transoms be spaced farther apart than in calm water conditions. To achieve this result, post member 101 will be extended further aft from its position of FIG. 22 so that locking blade 160 extends through rear recess 166 of barrel 152 and then into locking groove 170 of post member 101.

With respect to the utilization of the vertically moving locking blades 100 and 160 into and out of their respective locking grooves, it should be noted that the blades may be readily withdrawn radially upwardly from their locking grooves independently of the relative attitudes of the barges. This is an important feature since it permits the barges to be readily uncoupled in an emergency situation. The same is true with respect to the locking arrangement shown in FIGS. 1–8 of the drawings.

It will be apparent that the post member shown in FIGS. 9–23 like those shown in FIGS. 1–8, are free to undergo compression and tension in transferring compressive and tensive forces between adjoining vessels while permitting the adjoining vessels to undergo simultaneous relative movement in roll, pitch, yaw, surge and heave. This is true because of the resilient nature of the center bodies of these post members and the fact that such center bodies are unconfined. Additionally, the resilient nature of the post members provide an impedance in the force path between the vessels which reduces the forces caused by relative motion therebetween and spreads these reduced forces over a longer time period. In this manner, the post members absorb, cushion, reduce and transfer forces without permitting a peak build-up to occur, as is the case with non-resilient couplings.

Various modifications and changes may be made with respect to the foregoing detailed description without departing from the spirit of the present invention.

I claim:

1. Force-transfer coupling apparatus interposed between two closely adjoining vessels, comprising:
   post means having a generally elongated body formed of an unconfined resilient material, said post means normally extending horizontally and longitudinally in a cantilever fashion relative to said vessels;
   horizontally and longitudinally extending socket means on the facing bow and stern portions of said vessels that receive the ends of said post means, the body of resilient material bridging the gap between said vessels, and said post means being longitudinally adjustable relative to said socket means;
   lock means operatively interposed between said socket means and said post means for securing said post means therewithin at longitudinally adjusted positions relative to said socket means; and
   with said resilient material being free to undergo bending, compression and tension in transferring compressive and tensive forces between said vessels.

2. Force-transfer coupling apparatus as set forth in claim 1 which further includes a tension element operatively associated with said post means to limit the longitudinal distance said elongated body can be stretched when said post means is placed in tension.

3. Force-transfer coupling apparatus as set forth in claim 2 wherein said tension element extends through said body and has its opposite ends secured to front and rear cap elements and a snubber means are interposed between at least one of said cap elements and said body to absorb tension loads applied to said post means.

4. Force-transfer coupling apparatus as set forth in claim 3 wherein said snubber means include annular elements formed of resilient material coaxial with said tension element.

5. Force-transfer coupling apparatus as set forth in claim 2 wherein said body has its opposite ends secured to front and rear cap elements and said tension element is secured to said cap elements and extends through said body.

6. Force-transfer coupling apparatus as set forth in claim 5 wherein said apparatus further includes lock means operatively associated with said socket means and selectively engageable with said cap elements.

* * * * *